March 4, 1958  J. W. BURLEY  2,825,091
WIRE COATING APPARATUS
Filed Aug. 6, 1954  6 Sheets-Sheet 1
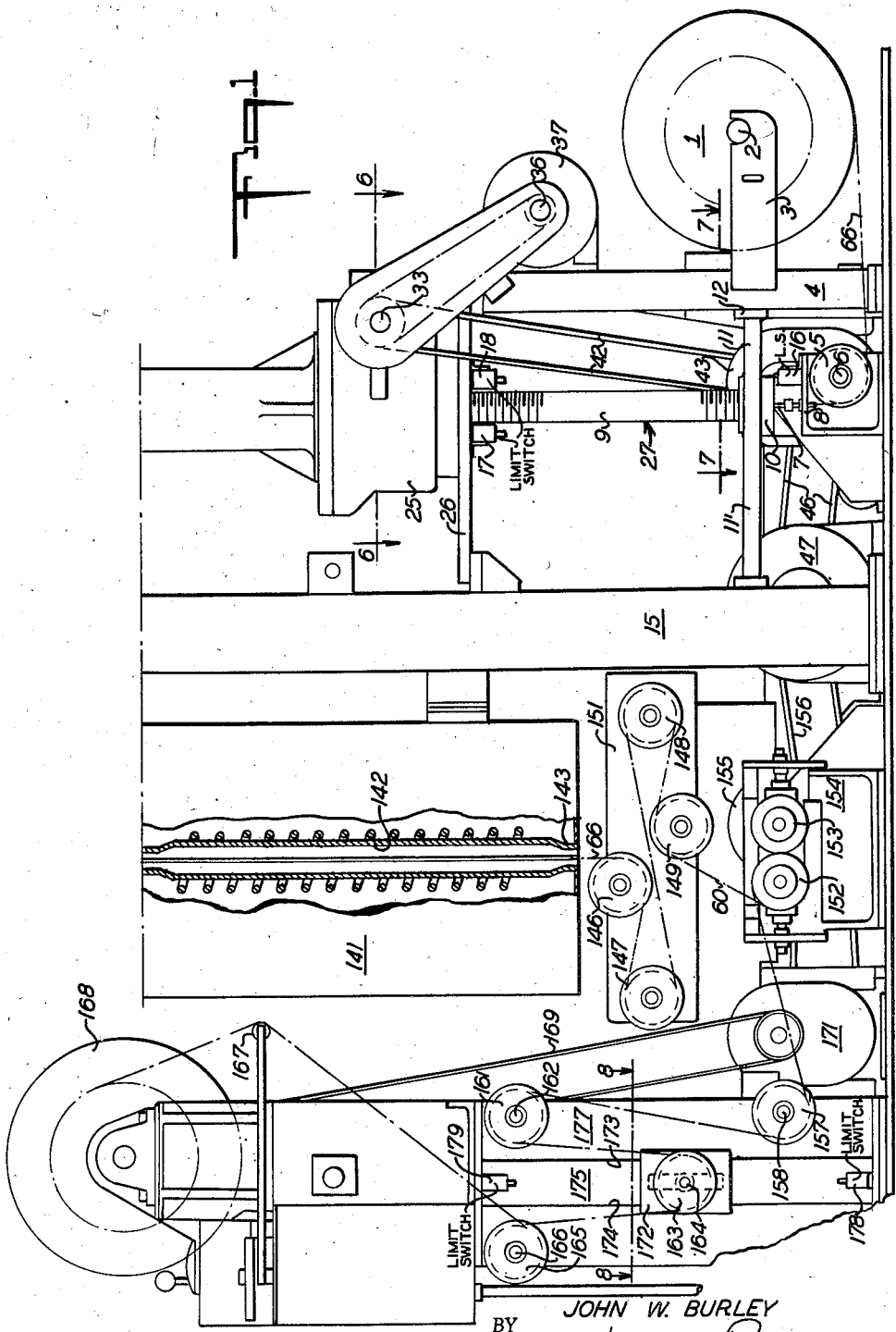
JOHN W. BURLEY
BY Louis Burgess
ATTORNEY

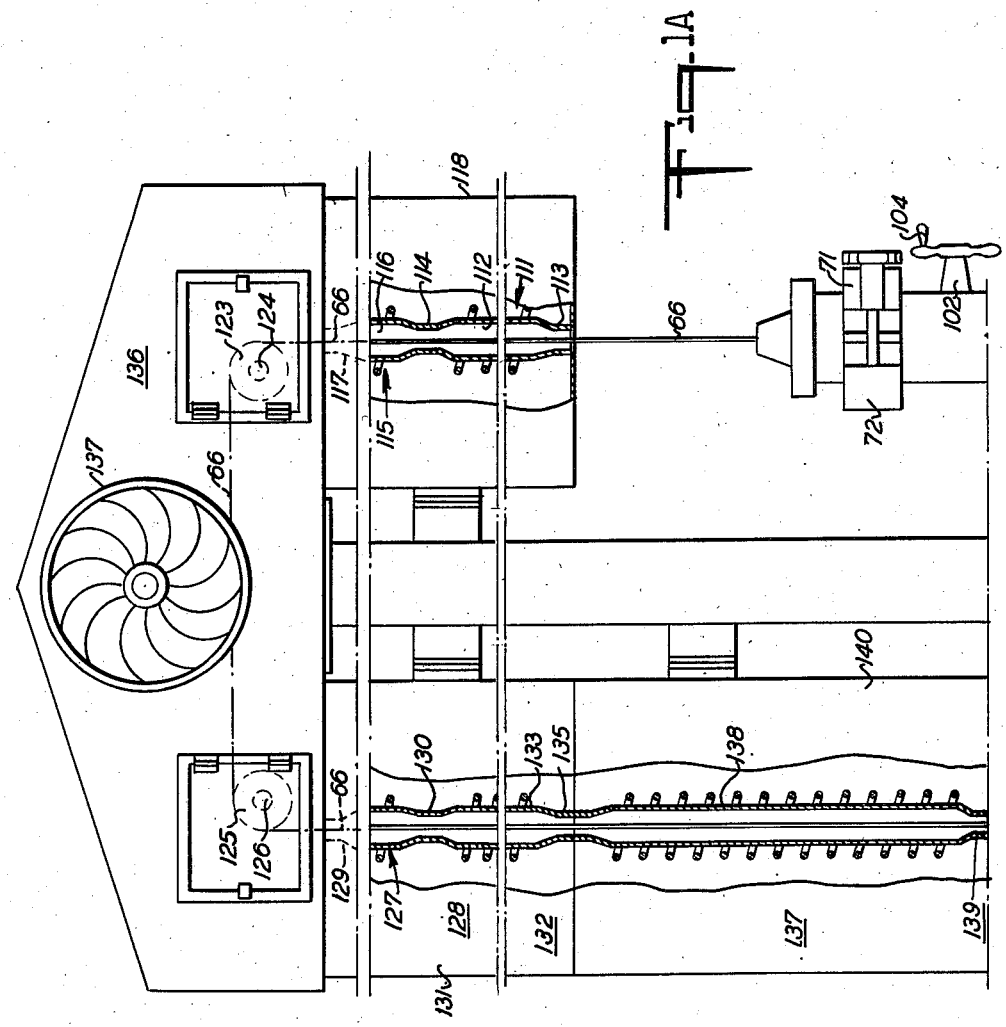

March 4, 1958 J. W. BURLEY 2,825,091
WIRE COATING APPARATUS
Filed Aug. 6, 1954 6 Sheets-Sheet 3
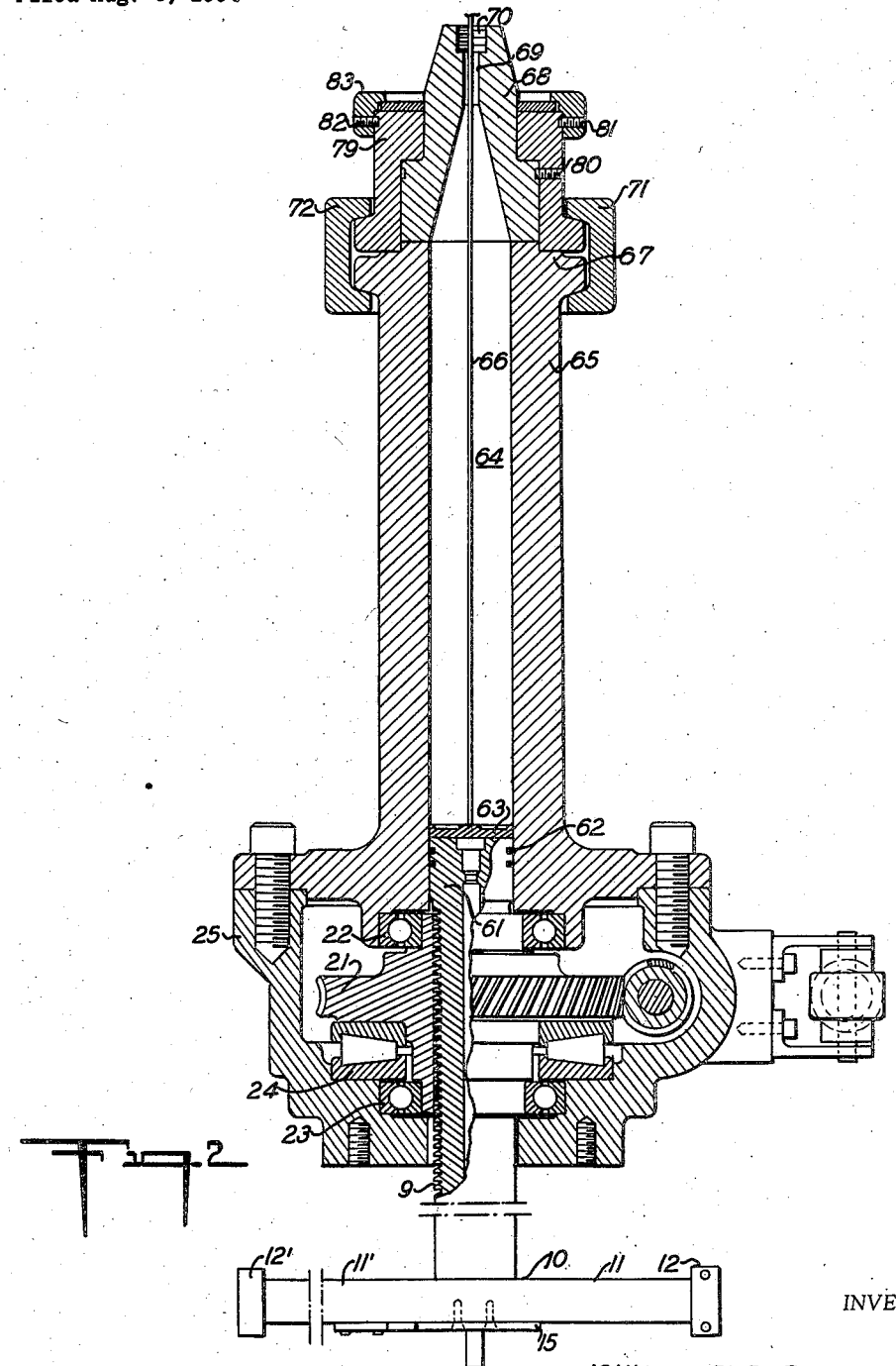
INVENTOR
JOHN W. BURLEY
BY Louis Bargess
ATTORNEY

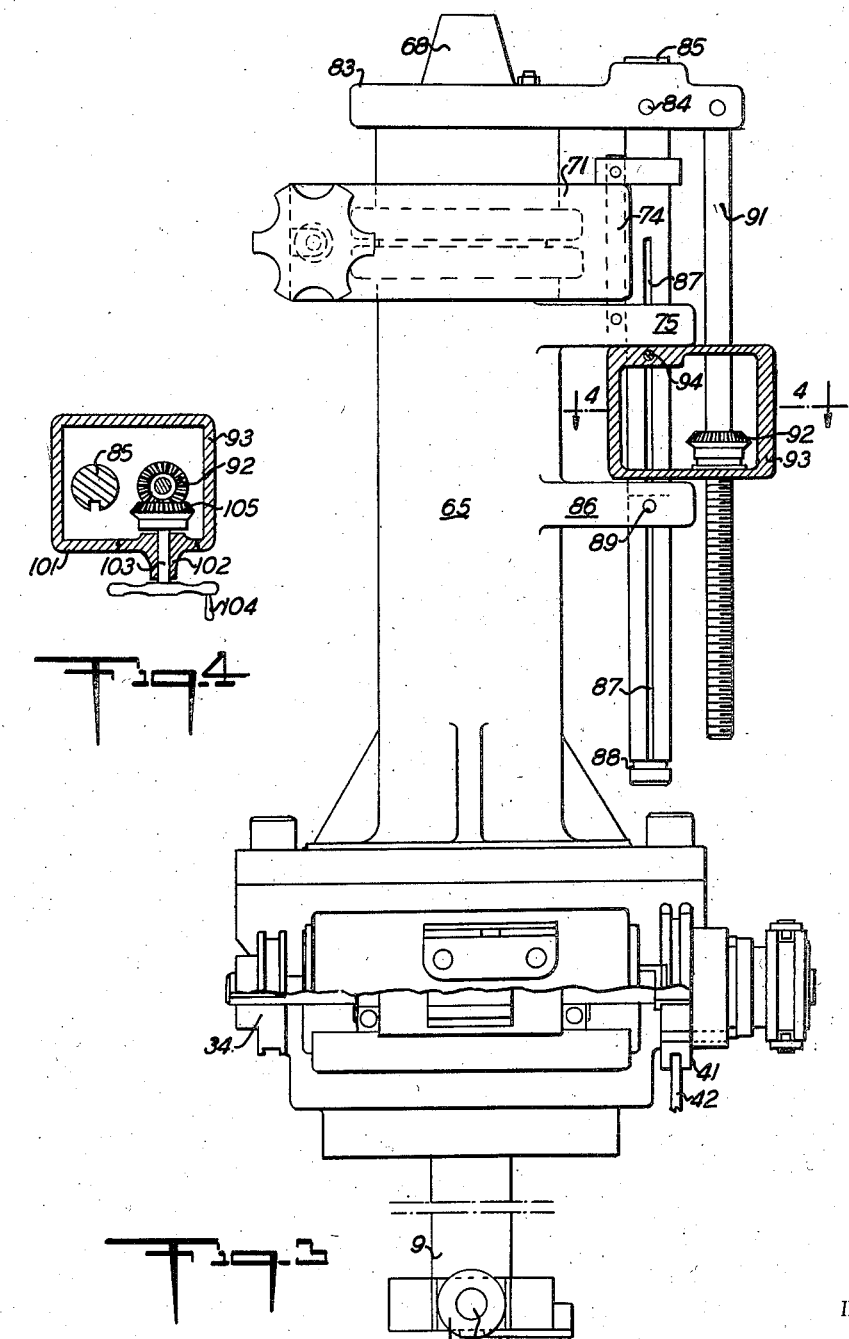

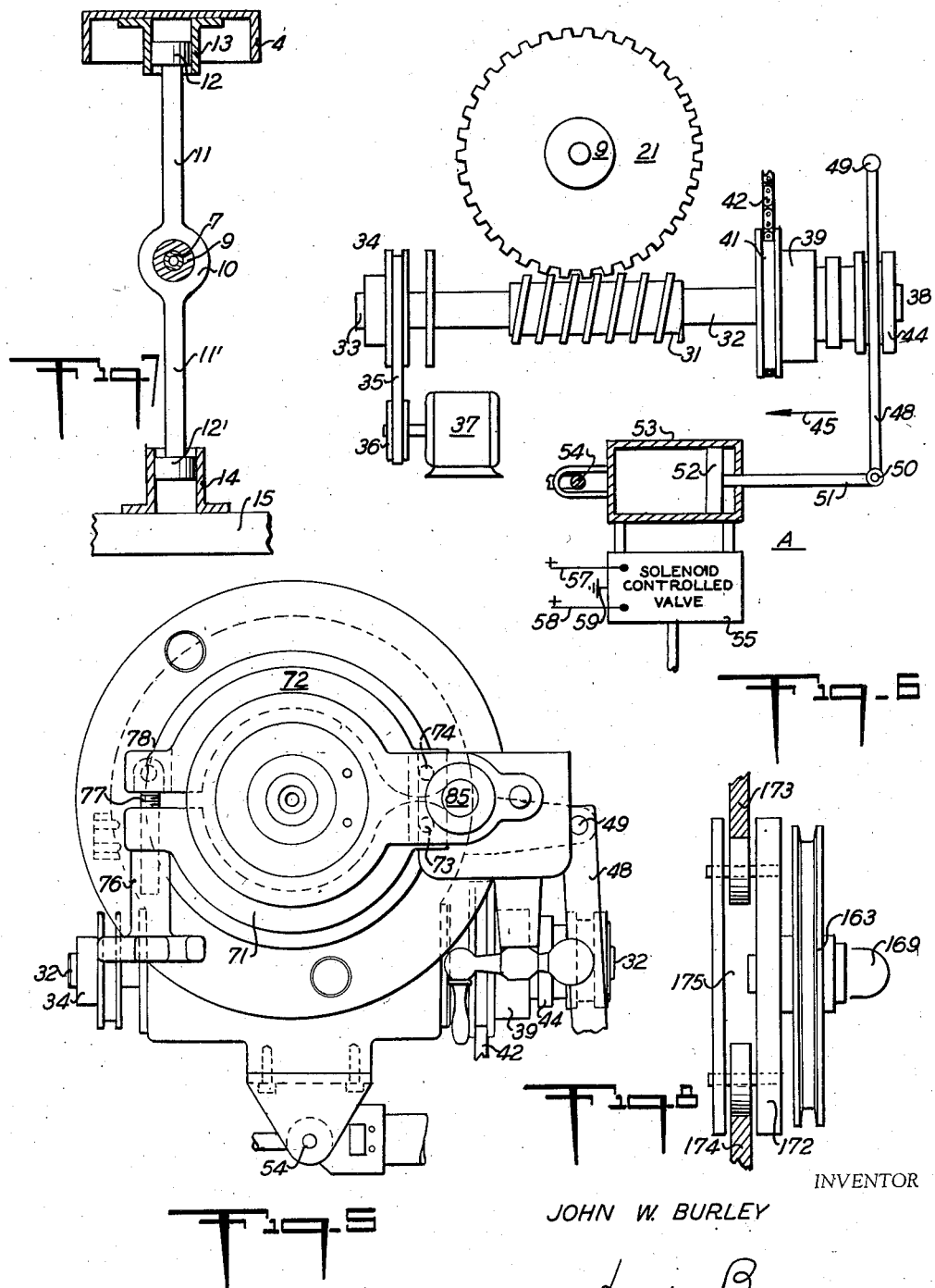

March 4, 1958  J. W. BURLEY  2,825,091
WIRE COATING APPARATUS
Filed Aug. 6, 1954  6 Sheets-Sheet 6
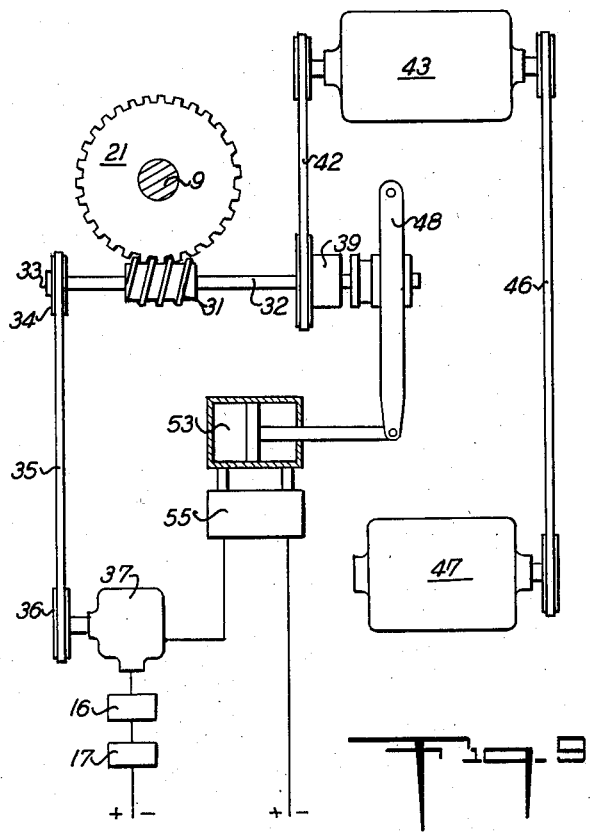
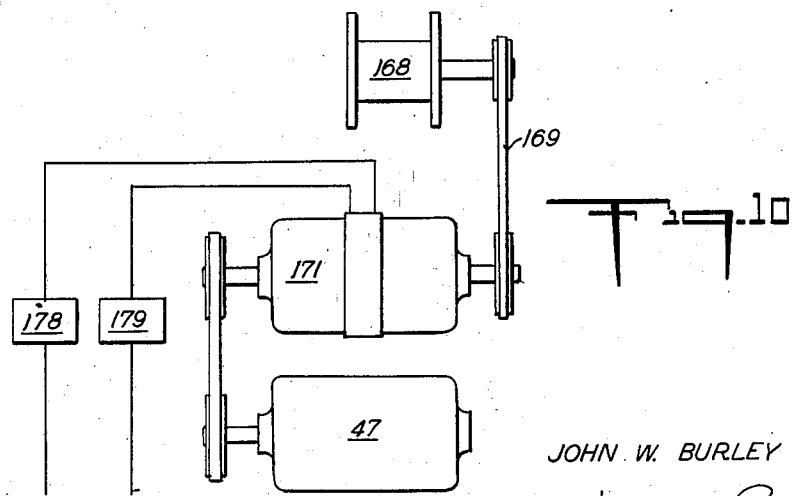
INVENTOR
JOHN W. BURLEY
BY  Louis Burgess
ATTORNEY United States Patent Office 2,825,091
Patented Mar. 4, 1958

2,825,091

WIRE COATING APPARATUS

John W. Burley, Havertown, Pa., assignor to Jennings Machine Corporation, a corporation of Pennsylvania Application August 6, 1954, Serial No. 448,193

5 Claims. (Cl. 18—13)

This invention is a new and useful improvement in wire coating apparatus and will be fully understood from the following description read in conjunction with the drawings in which:

Figs. 1 and 1-A constitute a side elevation with parts in section of the apparatus of my invention;

Fig. 2 is a vertical section through part of the construction shown in Fig. 1;

Fig. 3 is a side view of the construction shown in Fig. 2;

Fig. 4 is a horizontal section through part of the construction shown in Fig. 3 on the plane indicated by 4—4;

Fig. 5 is a top view of part of the construction shown in Fig. 1;

Fig. 6 is a horizontal section through part of the construction shown in Fig. 1 on the plane indicated by 6—6;

Fig. 7 is a horizontal section through part of the construction shown in Fig. 1 on the plane indicated by 7—7;

Fig. 8 is a horizontal section through part of the construction shown in Fig. 1 on the plane indicated by 8—8;

Fig. 9 is a diagram of an electrical circuit involved in the construction shown in Fig. 1, and Fig. 10 is a wiring diagram of another electrical circuit involved in the construction shown in Fig. 1.

One object of the invention is the provision of means for the more accurate control of finishing by heating of the wire coating composition in those cases in which, following application of the coating to the wire, the coating must be heated to separate predetermined temperatures to develop the required physical properties.

Another object of the invention is the provision of means to enable the final stage of heating to be carried out in the absence of decomposition products evolved in the earlier stages.

Another object of the invention is the provision of means for drawing a wire to be coated through the coating and through the subsequent heating stages at an accurately controlled and uniform rate of speed.

Another object of the invention is the provision of means for moving the extruder ram at one rate of speed when under load and at a higher rate of speed when not under load, without danger of interference between the respective movers.

Referring to the drawings, 1 indicates the bare wire supply, which is a spool carrying a supply of the wire to be coated. The spool is equipped with some form of braking device (not shown) to prevent the wire from unwinding freely and to permit it to leave the spool only as it is drawn through the apparatus. Spool 1 is carried by axle 2 resting in bracket 3 carried by upstanding channel 4. From the spool 1 the wire is guided over the pulley 5 carried by shaft 6, passing thence in a vertically upward direction through the guide tube 7. Tube 7 is fixed in position and is mounted on the bracket 8. As shown in Fig. 1, the tube extends upwardly for a distance in the tubular threaded ram 9. As indicated in Figs. 2 and 7, the tubular threaded ram 9 is provided adjacent its lower end with hub 10 integral with horizontally extending arms 11 and 11' provided at their extremities with rollers 12 and 12', which rollers move vertically in the guide 13 carried by channel 4 and the guide 14 carried by column 15. This restrains the threaded ram 9 from turning while permitting it to move vertically. In the position shown in Fig. 1, the bottom of hub 10 engages limit switch 16. When the threaded ram 9 is in the position of maximum lift, the top of hub 10 engages limit switches 17 and 18 (Fig. 1).

As shown in Fig. 2, the threaded ram 9 is threaded into the internally threaded worm wheel 21 turning in ball bearings 22 and 23, downthrust being taken up by the tapered roller bearing 24. Elements 21–24 are supported in housing 25, which in turn is carried by the horizontal member 26 secured at one end to vertical channel 4 and at the other end to column 15.

Details of the manner in which threaded ram 9 is actuated by the turning of worm wheel 21 appear in Fig. 6 and include worm 31 carried by shaft 32. At the end 33 the shaft 32 carries pulley 34 directly coupled through belt 35 to pulley 36, driven by motor 37. Adjacent the end 38 of shaft 32 there is mounted clutch 39, which is freely turnable on shaft 32, and is integral with sprocket 41 carrying chain 42.

Sprocket 41 is driven by electrically controlled variable speed changer 43 (Fig. 1). When collar 44 (Fig. 6) is moved in the direction indicated by arrow 45, clutch 39 engages shaft 32 and shaft 32 is then driven through sprocket 41 by chain 42 which, as stated, is in turn driven by electrically controlled variable speed changer 43. The electrically controlled variable speed changer is driven through belt 46 by motor 47 (Fig. 1). The collar 44 is moved by arm 48 pivotally mounted about the point 49. The free end 50 of arm 48 is connected to the piston rod 51, which in turn is connected to piston 52 reciprocating in cylinder 53. Cylinder 53 is in turn pivotally mounted about the point 54. The position of 52 in cylinder 53 is determined by solenoid controlled air valve 55 diagrammatically indicated in Fig. 6, which in turn is controlled by the application of current to lead 57 or lead 58 returning through ground 59.

The upper end 61 (Fig. 2) of threaded ram 9 is provided with annular grooves carrying sealing rings 62, and at its upper end with a centrally perforated disc 63 of yielding material adapted to prevent the escape of any extrudable material from the space 64 defined by cylinder 65. In operation the cylinder is charged with the extrudable material with which the wire 66 is to be coated. The upper end 67 of cylinder 65 carries die 68 provided with central opening 69 through which the wire and the coating composition emerge from the die 68. This opening carries thread 70 in which orifices of desired sizes may be inserted. The die 68 is secured to the upper end 67 of cylinder 65 by means of clamps 71 and 72. As indicated in Figs. 3 and 5, these clamps are pivotally carried by studs 73 and 74 seated in horizontal lug 75, which is integral with cylinder 65. The clamps 71 and 72 may therefore be swung apart to permit removal of the die 68. When, however, the die 68 is to be locked in engagement with cylinder 65, this is done (Fig. 5) by means of hand wheel 76 threaded to shaft 77 pivotally secured at 78 to clamp 72. The die 68 is secured (Fig. 2) to die holder 79 by screw 80; the die holder is secured by screws 81 and 82 to horizontal flange 83. The horizontal flange 83 is in turn locked by pin 84 to the upper end of vertical shaft 85 vertically slidable in horizontal lugs 75 and 86. The shaft 85 (Fig. 3) is provided with vertical keyway 87 terminating at the lower end of the shaft in the horizontal groove 88. The stud 89 carried by lug 86 projects into vertical keyway 87 to secure the shaft 85 against turning. When, however, shaft 85 is in the position of maximum lift, the groove 88 registers with stud 89 so that shaft 85 can be turned. For the purpose of raising and lowering shaft 85 and horizontal flange 83 carried thereby, there is provided threaded shaft 91 (Fig. 3) engaged by the interiorly threaded miter gear 92 carried in housing 93. Housing 93 carries stud 94 which projects into vertical keyway 87, with the result that housing 93 is turnable with shaft 85 while shaft 85 is longitudinally slidable with respect to housing 93. When therefore the miter gear 92 is turned to raise shaft 91 and thereby bring shaft 85, horizontal flange 83 and the attached die holder 79 and die 68 to the topmost position, the shaft 85 may be turned to expose the top of cylinder 65 for recharging, and while so turned, inasmuch as it is secured in vertical position by stud 89 projecting into groove 88, there is no danger that the die will suddenly drop and injure workmen engaged in recharging the cylinder. Details of the mechanism by which the lifting is accomplished appear in Fig. 4, by reference to which it will be seen that the housing 93 is integral with side wall 101 carrying boss 102 forming a bearing for shaft 103, which is turnable by handle 104. Shaft 103 at the inside end carries the miter gear 105 mating with miter gear 92.

The wire 66 is drawn upwardly through cylinder 65 and die 68 at a predetermined rate, while the ram 61 is advanced upwardly at a predetermined rate, the cylinder 65 having first been charged with the extrudate, with the result that the wire emerges from the upper end of the die 68 with an applied covering of the extrudate.

Referring again to Figs. 1 and 1-A, oven 111 is a heater, preferably of the electrical resistance type, defining a heating zone 112 coaxial with wire 66, independently controllable and bounded by constrictions 113 and 114. This is surmounted by oven 115 defining heating zone 116 coaxial with wire 66 independently controllable and bounded by constrictions 114 and 117 all mounted in a single jacket 118. The wire is guided centrally upward within heating zones 112 and 116 by pulley 123 mounted on shaft 124 and passes thence horizontally to pulley 125 mounted on shaft 126, from which it passes downwardly into the upper end of heating zone 127 defined by oven 128 independently controllable and bounded by constrictions 129 and 130. Immediately below also in jacket 131 is oven 132 defining heating zone 133 independently controllable and bounded by constrictions 130 and 135. The upper end of oven 115 and the upper end of oven 128 terminate in hood 136 provided with blower 137, rotated by suitable means (not shown) and which is adapted to maintain a light suction within hood 136 for the purpose of carrying upwardly any vapors disengaged in heating zones 116 and 127, and conveying same out of the apparatus, sufficient leakage being provided around the edge of the hood to dilute and cool the vapor. Immediately below and coaxial with ovens 128 and 132 is oven 137 defining heating zone 138 independently controllable and bounded by constrictions 135 and 139. Immediately below oven 137 in common jacket 140 is oven 141 defining heating zone 142, independently controllable and bounded by constrictions 139 and 143. As the wire 66 emerges from the lower end of oven 141, it passes over pulleys 146, 147, 148 and 149 carried by plate 151. The purpose of these pulleys is simply to enable the applied coating to cool before the now coated wire passes to the take-up mechanism. From the pulley 149 the coated wire 66 passes onto the drums 152 and 153 of the capstan 154, by which the wire is drawn through the apparatus at a predetermined rate. The capstan 154 is also driven through an electrically controlled variable speed changer 145 driven through belt 156 by motor 47. From the capstan 154 the wire passes over a pulley 157 carried by shaft 158, thence over pulley 161 carried by shaft 162, and thence over pulley 163 carried by shaft 164, thence over pulley 165 carried by shaft 166, and thence over guide 167 to the take-up reel 168. The take-up reel is driven by belt 169 from electrically controlled variable speed changer 171, which is also driven by motor 47.

The pulley 163 (Figs. 1 and 8) is carried by plate 172 reciprocating in guides 173 and 174, which permit free vertical movement of the plate and pulley in the space 175 between uprights 176 and 177. At its upper limit of travel plate 172 contacts the limit switch 179 and at its lower limit of travel, contacts the limit switch 178. If the take-up reel 168 is turning too slowly, the result is that the pulley 163 and plate 172 descend, ultimately striking and energizing the limit switch 178, which in turn by means of the electrical circuit shown in Fig. 9, increases the speed ratio of the speed changing device 171, thereby increasing the rate of turning of the take-up reel 168. Conversely, if the take-up reel 168 is turning too rapidly, this will result in moving the pulley 163 and the plate 172 upwardly until plate 172 contacts and actuates the limit switch 179, which by means of the electrical circuit shown in Fig. 10 will operate through the speed changing device to reduce the rate of turning of the take-up reel 168. In practice the speed changer controls are set for two speeds, one of which is slightly greater than the rate of movement of the wire through the apparatus, and one of which is slightly slower than the movement of the wire through the apparatus. In this way the pulley 163 and the plate 172 always gradually approach either the top or the bottom of the vertical path. This system of control of the take-up reel is found to be very much more reliable in practice than the provision of a slip clutch on the wire take-up mechanism.

Referring now to the wiring diagram shown in Fig. 9 as hereinabove explained, the shaft 32 which through worm 31 and worm wheel 21 operates threaded ram 9, may be driven either through motor 37 or on engagement of clutch 39 through chain 42 by the electrically controlled variable speed changer 43, which in turn is driven through belt 46 by motor 47. Motor 37 is adapted to turn shaft 32 either way when not under load, for the convenience of the operator, whereas the variable speed changer 43 is adapted to turn shaft 32 under load and in one way only to advance the ram upwardly for the purpose of extruding the wire coating composition. The circuit which includes motor 37 is therefore carried to solenoid control valve 55, with the result that whenever motor 37 is engaged, the clutch 39 is automatically and instantaneously disengaged. Further, whenever the threaded ram 9 moves to the lowermost position shown in Fig. 1, and engages the limit switch 16, the motor 37 is automatically disengaged, and conversely, whenever the threaded ram 9 moves to the uppermost position with the result that limit switches 17 and 18 are actuated, motor 37 and the variable speed changer 43 are both automatically and instantaneously disengaged.

I claim:

1. Apparatus for coating wire with an extrudable compound comprising a vertical cylinder, a die defining a central aperture at the upper end of said cylinder, a ram defining a central aperture slidable longitudinally in said cylinder, means for advancing said ram, a first oven defining a first heating zone coaxial with and above said cylinder, a second oven defining a second heating zone parallel to said first heating zone, a wire guide oriented to conduct a wire from said die upwardly through said first heating zone, thence horizontally and thence downwardly through said second heating zone, a hood surmounting the upper end of said first and second heating zones, means for creating a suction in said hood, and a capstan adapted to draw a wire through said guiding means.

2. Apparatus for coating wire with an extrudable compound comprising a vertical cylinder, a die defining a central aperture at one end of said cylinder, a ram defining a central aperture slidable longitudinally in said cylinder, means for advancing said ram comprising a threaded shank and an internally threaded worm gear engaging said threaded shank, a worm driving said gear and a shaft carrying said worm, a clutch controllably engaging said shaft, a first motor adapted to advance said ram against an extrudable compound on closing of said clutch, electrical means controlling said clutch, a second motor directly coupled to said shaft and adapted to advance said ram at a relatively higher rate of speed when not under load, an electrical circuit including said second motor operating through said means controlling to disengage said clutch on energizing said motor circuit.

3. Apparatus for coating wire with an extrudable compound comprising a vertical cylinder, a die defining a central aperture at the upper end of said cylinder, a ram defining a central aperture slidable longitudinally in said cylinder, means for advancing said ram, a first oven defining a first heating zone coaxial with and above said cylinder, a second oven defining a second heating zone parellel to said first heating zone, a wire guide oriented to conduct a wire from said die upwardly through said first heating zone, thence horizontally and thence downwardly through said second heating zone, and a capstan adapted to draw a wire through said guiding means.

4. An apparatus as in claim 3 in which said die is part of an assembly held during extrusion of said compound about the wire against displacement relative to said cylinder by semi-circular clamps pivotally supported at one end and releasably held together at the opposite end to clamp said assembly and said cylinder, said clamps when released and swung away from one another permitting lifting of said die-assembly from said cylinder for charging of said cylinder with said extrudable coating material.

5. An apparatus as in claim 4 additionally including mechanism operable when said clamps are released and swung apart to raise and lower said die-assembly with respect to said cylinder and for supporting said die-assembly in raised position above said cylinder during charging of the cylinder with extrudable material.

References Cited in the file of this patent

UNITED STATES PATENTS

| | | |
|---|---|---|
| 1,444,079 | Maring | Feb. 6, 1923 |
| 1,649,892 | Daniels | Nov. 22, 1927 |
| 1,939,041 | Cherry | Dec. 12, 1933 |
| 2,069,087 | Forstrom et al. | Jan. 26, 1937 |
| 2,175,099 | Abbot | Oct. 3, 1939 |
| 2,218,385 | Schulze | Oct. 15, 1940 |
| 2,457,459 | Gloor | Dec. 28, 1948 |
| 2,607,541 | Morgan et al. | Aug. 19, 1952 |
| 2,653,773 | Davis | Sept. 29, 1953 |